US009477073B2

(12) United States Patent  
Kasahara

(10) Patent No.: US 9,477,073 B2  
(45) Date of Patent: Oct. 25, 2016

(54) IMMERSION MICROSCOPE OBJECTIVE AND MICROSCOPE USING THE SAME

(71) Applicant: OLYMPUS CORPORATION, Tokyo (JP)

(72) Inventor: Takashi Kasahara, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/514,107

(22) Filed: Oct. 14, 2014

(65) Prior Publication Data

US 2015/0109682 A1 Apr. 23, 2015

(30) Foreign Application Priority Data

Oct. 18, 2013 (JP) ................................. 2013-217794

(51) Int. Cl.
*G02B 21/02* (2006.01)
*G02B 21/33* (2006.01)
*G02B 21/16* (2006.01)

(52) U.S. Cl.
CPC .............. *G02B 21/33* (2013.01); *G02B 21/02* (2013.01); *G02B 21/025* (2013.01); *G02B 21/16* (2013.01)

(58) Field of Classification Search
CPC ..... G02B 21/33; G02B 21/02; G02B 21/025
USPC .................... 359/676–706, 819–830
See application file for complete search history.

(56) References Cited

U.S. PATENT DOCUMENTS

| 8,358,469 | B2 | 1/2013 | Kasahara |
| 8,488,248 | B2 | 7/2013 | Kasahara et al. |
| 8,582,202 | B2 * | 11/2013 | Terada ............... G01N 21/9501 359/368 |
| 8,988,780 | B2 | 3/2015 | Matthae et al. |
| 2010/0265574 | A1 | 10/2010 | Kasahara |
| 2011/0102899 | A1 * | 5/2011 | Taeko ................... G02B 21/02 359/576 |
| 2012/0113524 | A1 | 5/2012 | Kasahara et al. |
| 2013/0100537 | A1 | 4/2013 | Matthae et al. |

FOREIGN PATENT DOCUMENTS

| EP | 2453286 A1 | 5/2012 |
| EP | 2584392 A2 | 4/2013 |
| JP | 2010271693 A | 12/2010 |

(Continued)

OTHER PUBLICATIONS

Extended European Search Report dated Jun. 2, 2015, issued in counterpart European Application No. 14188748.9.

(Continued)

*Primary Examiner* — Mahidere Sahle  
(74) *Attorney, Agent, or Firm* — Holtz, Holtz & Volek PC

(57) ABSTRACT

An immersion microscope objective includes, in order from an object side, a first lens group having a positive refractive power, a second lens group, and a third lens group, wherein the first lens group changes a light beam from an object to a convergent light beam, the second lens group has a refractive power smaller than that of the first lens group, and the following conditional expression (1-1) is satisfied: 7.5 mm<$NA_0 \times d_0$ (1-1) where $NA_0$ denotes an object-side numerical aperture of the immersion microscope objective, and $d_0$ denotes a working distance of the immersion microscope objective.

7 Claims, 13 Drawing Sheets

(56) References Cited

FOREIGN PATENT DOCUMENTS

| JP | 2011075982 A | 4/2011 |
| JP | 2012118509 A | 6/2012 |
| JP | 2013140393 A | 7/2013 |
| JP | 2013152484 A | 8/2013 |
| JP | 5596810 B2 | 9/2014 |

OTHER PUBLICATIONS

Partial European Search Report dated Mar. 2, 2015, issued in counterpart European Application No. 14188748.9.

\* cited by examiner

IMMERSION MICROSCOPE OBJECTIVE AND MICROSCOPE USING THE SAME

CROSS-REFERENCE TO RELATED APPLICATION

The present application is based upon and claims the benefit of priority from the prior Japanese Patent Application No. 2013-217794 filed on Oct. 18, 2013; the entire contents of which are incorporated herein by reference.

BACKGROUND OF THE INVENTION

1. Field of the Invention

The present invention relates to an immersion microscope objective, and a microscope using the same.

2. Description of the Related Art

As a means of fluorescence observation, a method of fluorescence observation by multi-photon excitation has been known. In the multi-photon excitation, light of a wavelength in almost integral multiples of an absorption wavelength of a fluorescent substance is irradiated to a fluorescent material (sample) as excitation light. Here, a wavelength of the excitation light in the multi-photon excitation being almost an integral multiple of the absorption wavelength, energy of one photon of the excitation light is almost an integral submultiple for the multi-photon excitation as compared to a single-photon excitation. Therefore, in the multi-photon excitation, it is necessary to make a plurality of photons collide with one fluorescent substance simultaneously.

When the excitation light is converged by a microscope objective, a density of light becomes the highest at a focal position. Therefore, a probability of the plurality of photons colliding with the fluorescent substance becomes the highest at the focal position. In the multi-photon excitation, the fluorescent light is generated only at the focal position (or in the extreme proximity of the focal position). For making the density of light at the focal position high, it is necessary to make a diameter of a light spot formed at the focal position as small as possible. In view of such circumstances, the microscope objective is sought to have a large numerical aperture and a superior imaging performance. If the imaging performance is superior, a light spot in which, various aberrations have been corrected favorably, is formed at the focal position.

Moreover, the excitation light used in the multi-photon excitation is infrared light. Light has a feature of longer the wavelength, lesser is the susceptibility of scattering of light (Rayleigh scattering). Therefore, in a sample having a scattering characteristic such as of a biological sample, the infrared light having a long wavelength is capable of reaching up to even deeper position as excitation light. For observing a deep portion of a sample by using this feature, the microscope objective is sought to have a long working distance.

Furthermore, even among the infrared lights, light having a longer wavelength has smaller Rayleigh scattering. Therefore, light having a longer wavelength is capable of reaching even deeper position as the excitation light. For this reason, it is preferable that the microscope objective to be used in the multi-photon excitation has a superior imaging performance in the longer wavelength. Furthermore, it is preferable to be able to observe more wide area.

Moreover, in the observation of a deep position of a specimen, an aberration due to a refractive index of the sample cannot be ignored. Therefore, it is preferable that the microscope objective has a means of correcting fluctuation in such aberration.

As a microscope objective which has a large object-side numerical aperture and whose aberrations have been corrected favorably, immersion microscope objectives disclosed in Japanese Patent Application Laid-open Publication No. 2011-075982 and U.S. Unexamined Patent Application Publication No. 2013/0100537 are available.

SUMMARY OF THE INVENTION

In order to solve the above-described problems and achieve the object, an immersion microscope objective according to the present invention comprising, in order from an object side:

a first lens group having a positive refractive power;
a second lens group; and
a third lens group; wherein
the first lens group changes a light beam from an object to a convergent light beam,
the second lens group has a refractive power smaller than that of the first lens group, and
the following conditional expression (1-1) is satisfied:

$$7.5 \text{ mm} \leq NA_o \times d_0 \quad (1\text{-}1)$$

where
$NA_o$ denotes an object-side numerical aperture of the immersion microscope objective, and
$d_0$ denotes a working distance of the immersion microscope objective.

A microscope according to the present invention comprising:

a scanner section;
a main-body section; and
a microscope objective, wherein
the immersion microscope objective described above is used for the microscope objective.

DETAILED DESCRIPTION OF THE INVENTION

Figure 1:
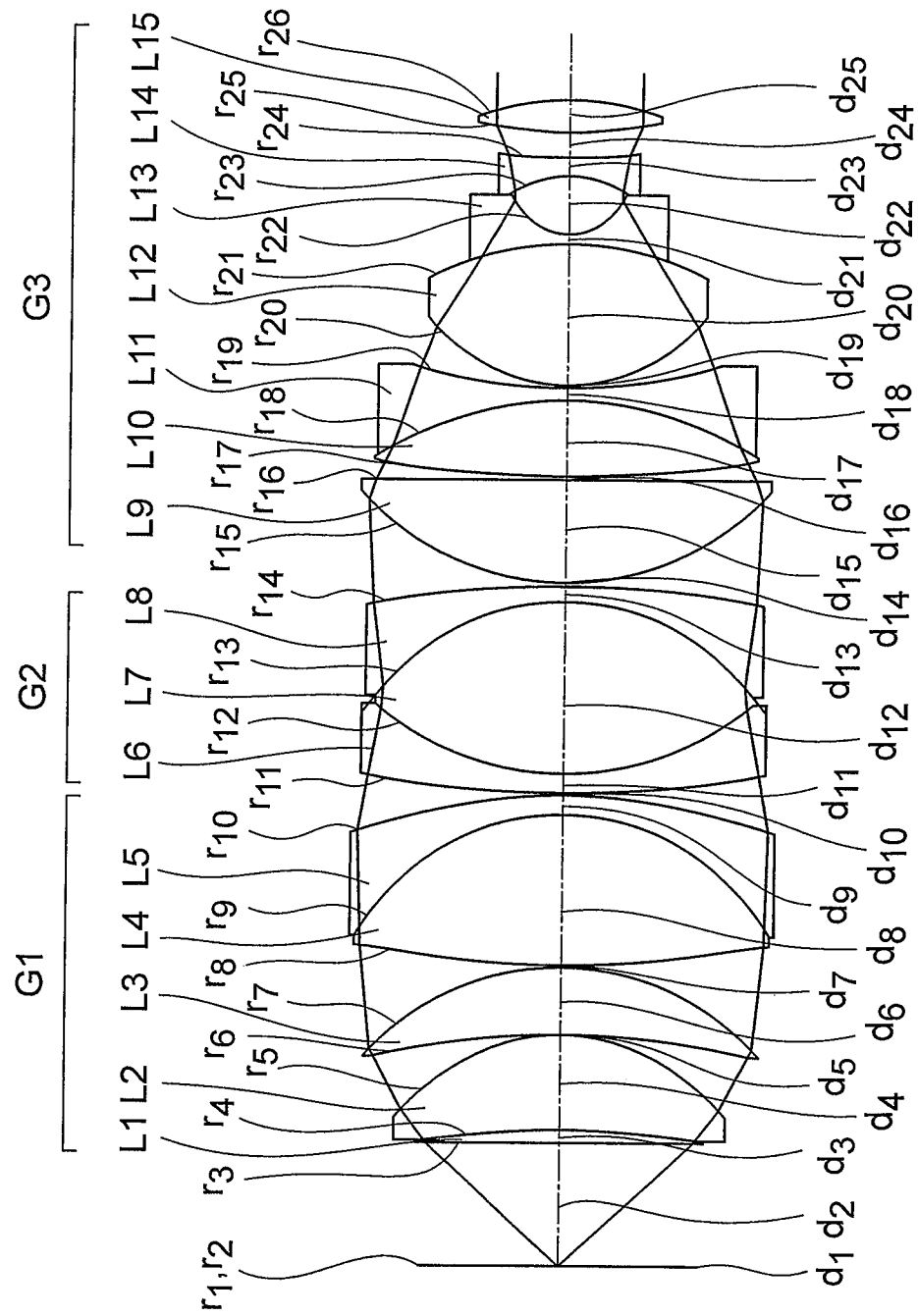
FIG. 1 is a cross-sectional view along an optical axis, showing an optical arrangement of an immersion microscope objective according to an example 1 of the present invention.

In the following description, for variables whose values change in accordance with wavelengths (for example, focal length, image-forming magnification, numerical aperture, etc.), values at a wavelength of 900 nm are used as references, unless otherwise specified. Further, a working distance refers to a distance from a focal position to a surface of the objective which is nearest to the object.

An immersion microscope objective according to an embodiment comprises, in order from an object side: a first lens group having a positive refractive power; a second lens group; and a third lens group; wherein the first lens group changes a light beam from an object to a convergent light beam, the second lens group has a refractive power smaller than that of the first lens group, and the following conditional expression (1-1) is satisfied:

$$7.5 \text{ mm} \leq NA_o \times d_0 \tag{1-1}$$

where $NA_o$ denotes an object-side numerical aperture of the immersion microscope objective, and $d_0$ denotes a working distance of the immersion microscope objective.

Here, it is preferable that the following conditional expression (1) is satisfied instead of the conditional expression (1-1).

$$7.5 \text{ mm} \leq NA_o \times d_0 \leq 18 \text{ mm} \tag{1}$$

Further, in the immersion microscope objective according to the present embodiment, it is preferable that the first lens group includes, in order from the object side, a cemented lens and a single lens having a positive refractive power, the cemented lens includes, in order from the object side, a planoconvex lens and a meniscus lens.

An immersion microscope objective according to another embodiment comprises, in order from an object side: a first lens group having a positive refractive power; a second lens group; and a third lens group; wherein the first lens group changes a light beam from an object to a convergent light beam, the second lens group has a refractive power smaller than that of the first lens group, the first lens group includes, in order from the object side, a cemented lens and a single lens having a positive refractive power, the cemented lens includes, in order from the object side, a planoconvex lens and a meniscus lens, and the following conditional expression (1) is satisfied:

$$7.5 \text{ mm} \leq NA_o \times d_0 \leq 18 \text{ mm} \tag{1}$$

where $NA_o$ denotes the object-side numerical aperture of the immersion microscope objective, and $d_0$ denotes the working distance of the immersion microscope objective.

The immersion microscope objective (hereinafter, referred to as the "objective" as appropriate) of the present embodiment includes, in order from the object side, the first lens group, the second lens group, and the third lens group. The first lens group has a positive refractive power as a whole and includes the cemented lens and the single lens having a positive refractive power. The cemented lens includes, in order from the object side, the planoconvex lens and the meniscus lens. The object side means a sample side.

If an object-side numerical aperture (hereinafter, simply referred to as the "numerical aperture") of the objective is made large, it is possible to make light with a larger angle of divergence (diffraction angle) incident on the objective from the sample. As a result, it is possible to observe a microscopic structure of the sample further minutely. Light with a large angle of divergence, however, has a high light-ray height in the first lens group. When such a light ray is bent sharply in the first lens group, a high order aberration is liable to occur in the first lens group.

Therefore, in the objective according to the present embodiment, the first lens group is configured to include the cemented lens and the single lens with a positive refractive power, to thereby cause the light ray with a large angle of divergence to be bent gradually with these lenses. The above configuration suppresses the occurrence of large high order aberration, and also changes the light beam from the object to a convergent light beam.

Further, the second lens group is configured to have a refractive power smaller than that of the first lens group. The light beam exiting the first lens group has already become a convergent light beam. Therefore, the second lens group is configured not to have a large refractive power, so that the occurrence of aberration in the second lens group is suppressed as much as possible. With this configuration, even in a case where the second lens group is moved along the optical axis, for example, the fluctuation (deterioration) in aberration caused by the movement of the second lens group can be minimized.

In the objective according to the present embodiment, the following conditional expression (1) is satisfied:

$$7.5 \text{ mm} \leq NA_o \times d_0 \leq 18 \text{ mm} \tag{1}$$

where $NA_o$ denotes the object-side numerical aperture of the immersion microscope objective, and $d_0$ denotes the working distance of the immersion microscope objective.

When the conditional expression (1) is satisfied, a sufficiently large numerical aperture and a sufficiently long working distance are obtained. This enables observation of a deeper portion of the sample with high resolving power. Further, various types of immersion liquids can be used. These advantages are particularly noticeable in fluorescence observation by two-photon excitation.

When exceeding the upper limit of the conditional expression (1), since the numerical aperture will become excessively large, it will become difficult to favorably correct the aberration. In a microscope objective, for example, a parfocal distance is limited to a discrete length. Therefore, when exceeding the upper limit of the conditional expression (1), it will become difficult, under such constraints, to correct the aberration so as to enable bright fluorescence observation with high resolving power.

When falling below the lower limit of the conditional expression (1), since it will become difficult to secure a sufficiently long working distance, it will become difficult to observe a deeper portion of the sample. In other cases, since the numerical aperture will become excessively small, it will become difficult to perform bright fluorescence observation with high resolving power.

Here, it is preferable that the following conditional expression (1') is satisfied instead of the conditional expression (1-1) or (1).

$$8 \text{ mm} \leq NA_o \times d_0 \leq 18 \text{ mm} \tag{1'}$$

As explained above, in the objective according to the present embodiment, it is possible to observe a deeper portion of a sample with high resolving power.

Further, in the objective according to the present embodiment, it is preferable that the following conditional expression (2) is satisfied:

$$10.6 \text{ mm} \leq d_0 \times nd_0 \leq 25 \text{ mm} \tag{2}$$

where $d_0$ denotes the working distance of the immersion microscope objective, and $nd_0$ denotes a refractive index of an immersion liquid for a d-line.

When the conditional expression (2) is satisfied, a deep portion of a sample can readily be observed with the objective having a large numerical aperture.

When exceeding the upper limit of the conditional expression (2), since the working distance will become excessively long, the numerical aperture will become small. Therefore, it will become difficult to perform bright fluorescence observation with high resolving power. In other cases, since the refractive index of the immersion liquid will become excessively large, the aberration caused by the difference between the refractive index of the immersion liquid and the refractive index of the sample will become large. Therefore, it will become difficult to observe a deeper portion of the sample.

When falling below the lower limit of the conditional expression (2), since the working distance will become excessively short, it will become difficult to observe a deep portion of the sample.

Here, it is preferable that the following conditional expression (2') is satisfied instead of the conditional expression (2).

$$11.6 \text{ mm} \leq d_0 \times nd_0 \leq 25 \text{ mm} \tag{2'}$$

Further, in the objective according to the present embodiment, it is preferable that the third lens group includes, in order from the object side, an object-side lens group and an image-side lens group, the object-side lens group includes a lens having a concave surface facing the image side and the concave surface is positioned nearest to an image side, the image-side lens group includes a lens having a concave surface facing the object side and the concave surface is positioned nearest to the object side, and the following conditional expressions (3) and (4) are satisfied:

$$0.02 \leq (d_1/d_0) \times (nd_m - nd_0) \leq 0.19 \tag{3}$$

$$0.01 \leq |d_1/R_1| \leq 0.185 \tag{4}$$

where $d_0$ denotes the working distance of the immersion microscope objective, $d_1$ denotes a thickness on an optical axis of a lens positioned nearest to the object side, $nd_0$ denotes the refractive index of the immersion liquid for the d-line, $nd_m$ denotes a refractive index of a meniscus lens positioned nearest to the object side for the d-line, and $R_1$ denotes a radius of curvature of an object-side surface of a prescribed meniscus lens, the prescribed meniscus lens being a meniscus lens that is positioned nearest to the object side among any meniscus lenses having an image-side surface constituting an air-contact surface.

In the third lens group, disposing the object-side lens group and the image-side lens group such that the concave surfaces of the respective groups face each other with an air space interposed therebetween, for example, makes it possible to bring the lens arrangement of the third lens group close to a Gauss-type lens arrangement. Here, at the positions of the object-side lens group and the image-side lens group, the height of the light ray is low. Therefore, the concave surface of the object-side lens group and the concave surface of the image-side lens group can make the Petzval's sum small. It should be noted that in the third lens group, the light beam from the second lens group is changed to a substantially parallel light beam.

Further, when the working distance becomes long, the height of the light ray becomes high at the lens surface positioned nearest to the object side. Therefore, an aberration is liable to occur in the lens group positioned nearest to the object side. When the conditional expression (3) is satisfied, the thickness on the optical axis of the lens positioned nearest to the object side and the refractive index of the meniscus lens of the first lens group can be optimized with respect to the working distance and the refractive index of the immersion liquid. As a result, it is possible to minimize the aberration that would occur in the lens group positioned nearest to the object side.

When exceeding the upper limit of the conditional expression (3), since the lens positioned nearest to the object side will become thick with respect to the working distance, a distance from the sample to the object-side surface of the meniscus lens becomes long. In such a case, larger aberration correction will have to be performed at the object-side surface of the meniscus lens. It is thus difficult to achieve a long working distance.

When falling below the lower limit of the conditional expression (3), since the lens positioned nearest to the object side will become thin, a refractive power at the object-side surface of the meniscus lens becomes small. In such a case, the aberration correction cannot be made sufficiently at the object-side surface of the meniscus lens. It is thus difficult to increase the numerical aperture of the objective.

When the conditional expression (4) is satisfied, the occurrence of aberration at the cemented surface of the cemented lens can be suppressed, while securing the working distance of sufficient length. As a result, it becomes possible to achieve a large numerical aperture and a long working distance at the same time.

It should be noted that the prescribed meniscus lens is a meniscus lens that is positioned nearest to the object side among any meniscus lenses having an image-side surface constituting an air-contact surface. For example, suppose that the cemented lens positioned nearest to the object side is made up of an object-side meniscus lens and an image-side meniscus lens. In this case, in the object-side meniscus lens, its image-side surface is a cemented surface. Thus, the object-side meniscus lens does not fall under the definition of the prescribed meniscus lens. On the other hand, in the image-side meniscus lens, its image-side surface is an air-contact surface. Thus, the image-side meniscus lens falls under the definition of the prescribed meniscus lens.

When exceeding the upper limit of the conditional expression (4), since the height of the light ray at the image-side surface of the cemented lens will become high, an aberration is liable to occur at the image-side surface of the cemented lens.

When falling below the lower limit of the conditional expression (4), since an aberration is liable to occur at the cemented surface of the cemented lens, it is difficult to achieve a large numerical aperture and a long working distance at the same time.

Here, it is preferable that the following conditional expression (3') is satisfied instead of the conditional expression (3).

$$0.02 \leq (d_1/d_0) \times (nd_m - nd_0) \leq 0.16 \quad (3')$$

Further, it is more preferable that the following conditional expression (3") is satisfied instead of the conditional expression (3).

$$0.02 \leq (d_1/d_0) \times (nd_m - nd_0) \leq 0.15 \quad (3")$$

Further, in the objective according to the present embodiment, it is preferable that the second lens group includes a cemented lens and moves along the optical axis, and that the following conditional expression (5) is satisfied:

$$0.205 \leq (OPL_{max} - OPL_{min})/f \leq 0.35 \quad (5)$$

where $OPL_{max}$ denotes a maximum optical path length of a plurality of prescribed optical path lengths, $OPL_{min}$ denotes a minimum optical path length of the plurality of prescribed optical path lengths, f denotes a focal length of an entire system of the immersion microscope objective, and the prescribed optical path length OPL is an optical path length between the immersion microscope objective and an in-focus position, and is expressed by the following expression (A):

$$OPL = \sum_{i=1}^{N} (W_i \times n_i) \quad (A)$$

where

N denotes the number of substances that are present between the immersion microscope objective and the in-focus position, $W_i$ denotes a width in an optical axis direction of an i-th substance among the substances, and $n_i$ denotes a refractive index at a wavelength of 900 nm of the i-th substance among the substances.

Sample observation is carried out using different types of immersion liquids. During the observations, since the optical path length from a surface of the sample to the objective, or the optical path length from a cover glass to the objective, varies, an aberration will occur (fluctuate).

Further, in the sample observation, the observation position may be changed in the depth direction. For example, in the case of a biological sample, there are various tissues in the biological sample, and different tissues have different refractive indices. Therefore, the optical path length between the objective and the in-focus position (observation position) varies depending on the types, the number, and the thicknesses of the tissues present between them.

In the objective according to the present embodiment, the second lens group includes the cemented lens and moves along the optical axis. This can suppress the occurrence (fluctuation) of the aberration. As a result, it is possible to maintain a favorable imaging performance, even if the type of the immersion liquid used is changed or the observation position is changed in the depth direction.

Further, as explained above, in the case of observing a deep portion of a sample, various substances including the immersion liquid and sample exist between the objective and the in-focus position. Here, the refractive index and thickness of the immersion liquid vary depending on the type of the immersion liquid used. Thus, the optical path length changes depending on the immersion liquid used. Further, in the case of a biological sample, there are various tissues with different refractive indices in the biological sample. Therefore, the optical path length varies depending on the types and the number of tissues present in the depth direction.

As such, in the observation of a sample, particularly of a biological sample, the optical path length from the objective to the in-focus position varies. Thus, in the case of moving the second lens group, it is preferable to satisfy the conditional expression (5). When the conditional expression (5) is satisfied, even if the amount of change in the optical path length is large, it is possible to suppress the fluctuation in aberration that accompanies the change of the optical path length, by moving the second lens group. As a result, it is possible to increase the types of immersion liquids that can be used and the types of samples (tissues) that can be observed. It is also possible to enlarge the observable range in the depth direction.

When exceeding the upper limit of the conditional expression (5), since the change in thickness or refractive index of the substance (sample or immersion liquid) will become large, an amount of change in the optical path length will become excessively large. In such a case, even if the second lens group is moved in the optical axis direction of the objective, it will be difficult to favorably correct the aberration. In other cases, the types of immersion liquids that can be used will decrease, or the observable range in the depth direction will become smaller.

When falling below the lower limit of the conditional expression (5), it will become difficult to observe the sample from its surface to its deep portion with high resolving power.

Further, in the objective according to the present embodiment, it is preferable that the following conditional expressions (6) and (7) are satisfied:

$$-1.3 \leq m_{g2} \leq -0.8 \quad (6)$$

$$-0.38 \leq f/f_{2m} \leq 0 \quad (7)$$

where $m_{g2}$ denotes a magnification of the second lens group, f denotes the focal length of the entire system of the immersion microscope objective, and $f_{2m}$ denotes a focal length of the second lens group.

When an immersion liquid or observation position is changed, an aberration is caused by the change. The second lens group is a lens group for correcting such aberrations. As explained above, the second lens group is moved in the optical axis direction to correct the aberrations. Here, if the conditional expression (6) is satisfied, the magnification of the second lens group will take a value close to 1 or −1, so the paraxial position of the focal position hardly changes even if the second lens group is moved. This facilitates the aberration correction by moving the second lens group.

Particularly, in an objective with a long working distance and a large amount of aberration correction, the change in the focal position caused by the movement of the lens group tends to become large. When the conditional expression (6) is satisfied, the change in the focal position becomes small even if the second lens group is moved. It is thus possible to implement an objective with superior operability and excellent aberration correction performance.

When exceeding the upper limit or falling below the lower limit of the conditional expression (6), the change in the focal position caused by the movement of the second lens group will become large. This leads to deterioration of the operability, and also makes the correction of spherical aberration insufficient.

The conditional expression (7) indicates that the refractive power of the second lens group is negative. In a lens group having a positive refractive power, the height of a light ray is high as compared to that in a lens group having a negative refractive power. Therefore, if the lens group having a positive refractive power is moved, the aberration caused by the movement will become large. The movement of the lens group having a positive refractive power is not preferable particularly in the case where the amount of correction of the spherical aberration is large. A lens group having a negative refractive power is suitably used as the lens group that is moved. When the conditional expression (7) is satisfied, the fluctuation in spherical aberration can be suppressed favorably even if the second lens group is moved.

When exceeding the upper limit of the conditional expression (7), the negative refractive power at the object-side lens surface of the second lens group will become excessively large. This will raise the height of the light lay in the second lens group, making it difficult to correct the spherical aberration caused by the movement of the second lens group. Moreover, high order spherical aberration or high order coma is liable to occur at the object-side lens surface of the second lens group.

When falling below the lower limit of the conditional expression (7), the height of the light ray in the second lens group will become excessively low. In this case, the light beam exiting the second lens group is likely to diverge. This makes it difficult to correct the coma.

A microscope according to the present embodiment includes: a scanner section; a main-body section; and a microscope objective, wherein one of the above-described immersion microscope objectives is used for the microscope objective.

With this configuration, it is possible to implement a microscope which enables observation of a deeper portion of a sample with high resolving power.

It should be noted that each of the conditional expressions may be used independently, or may be used freely in combination with any other conditional expressions. In either case, the effects of the present invention are achieved. Further, the upper limit or the lower limit of any conditional expression may be changed independently. The resultant conditional expression will achieve the effects of the present invention similarly.

Examples of the immersion microscope objective according to the present invention will be described in detail below by referring to the accompanying drawings. It should be noted that the present invention is not limited to the following examples.

Figure 2:
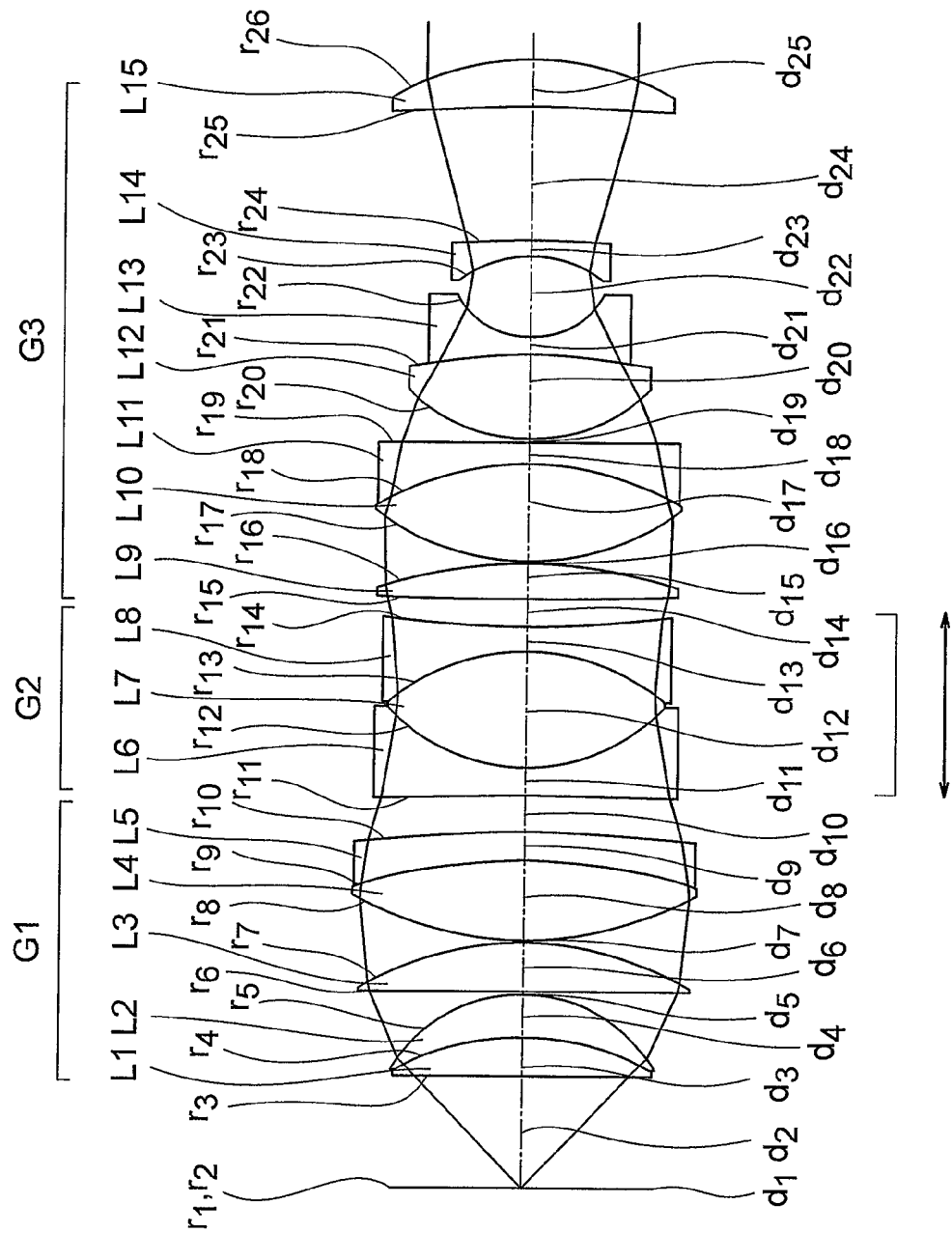
FIG. 2 is a cross-sectional view along an optical axis, showing an optical arrangement of an immersion microscope objective according to an example 2 of the present invention.
Figure 3:
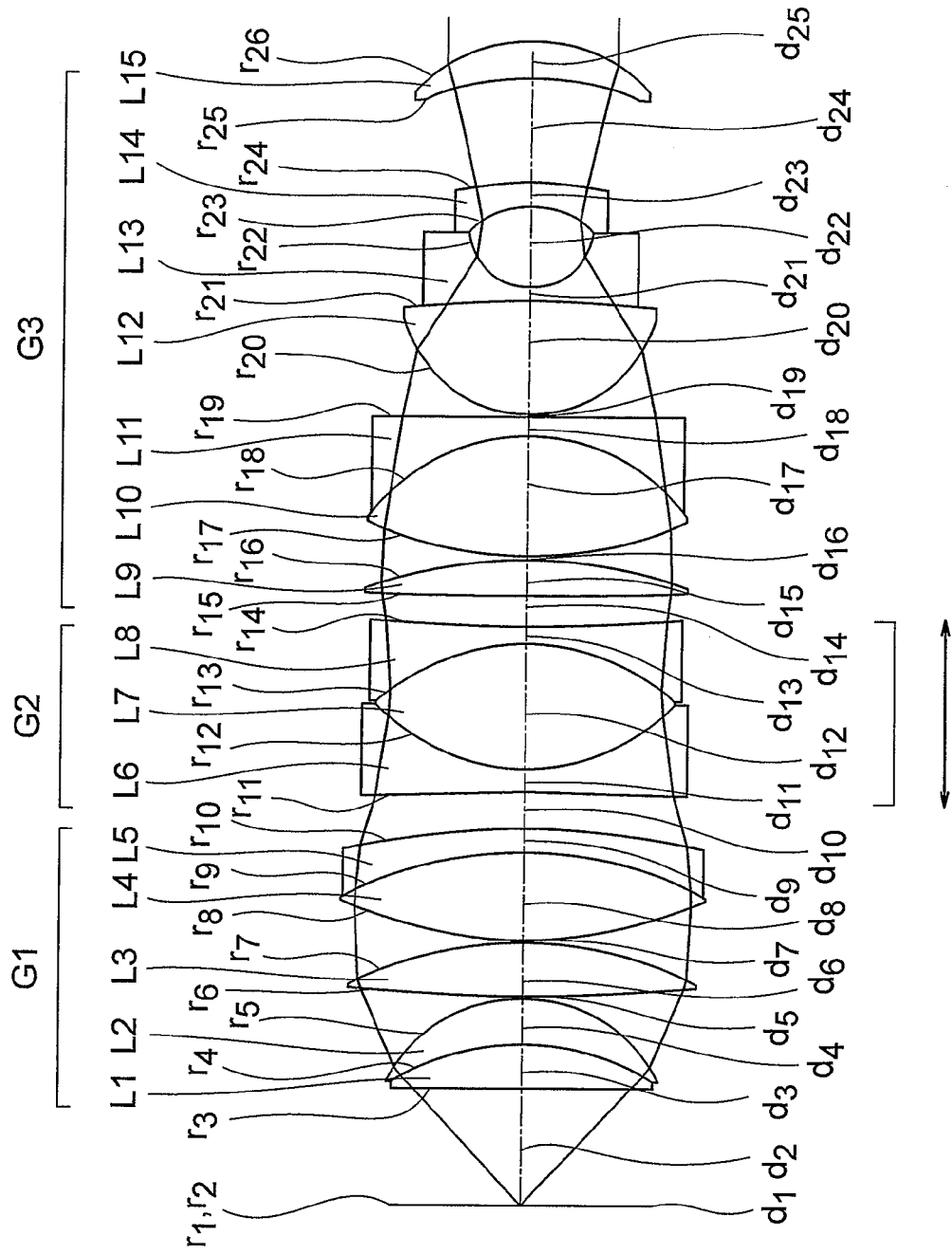
FIG. 3 is a cross-sectional view along an optical axis, showing an optical arrangement of an immersion microscope objective according to an example 3 of the present invention.
Figure 4:
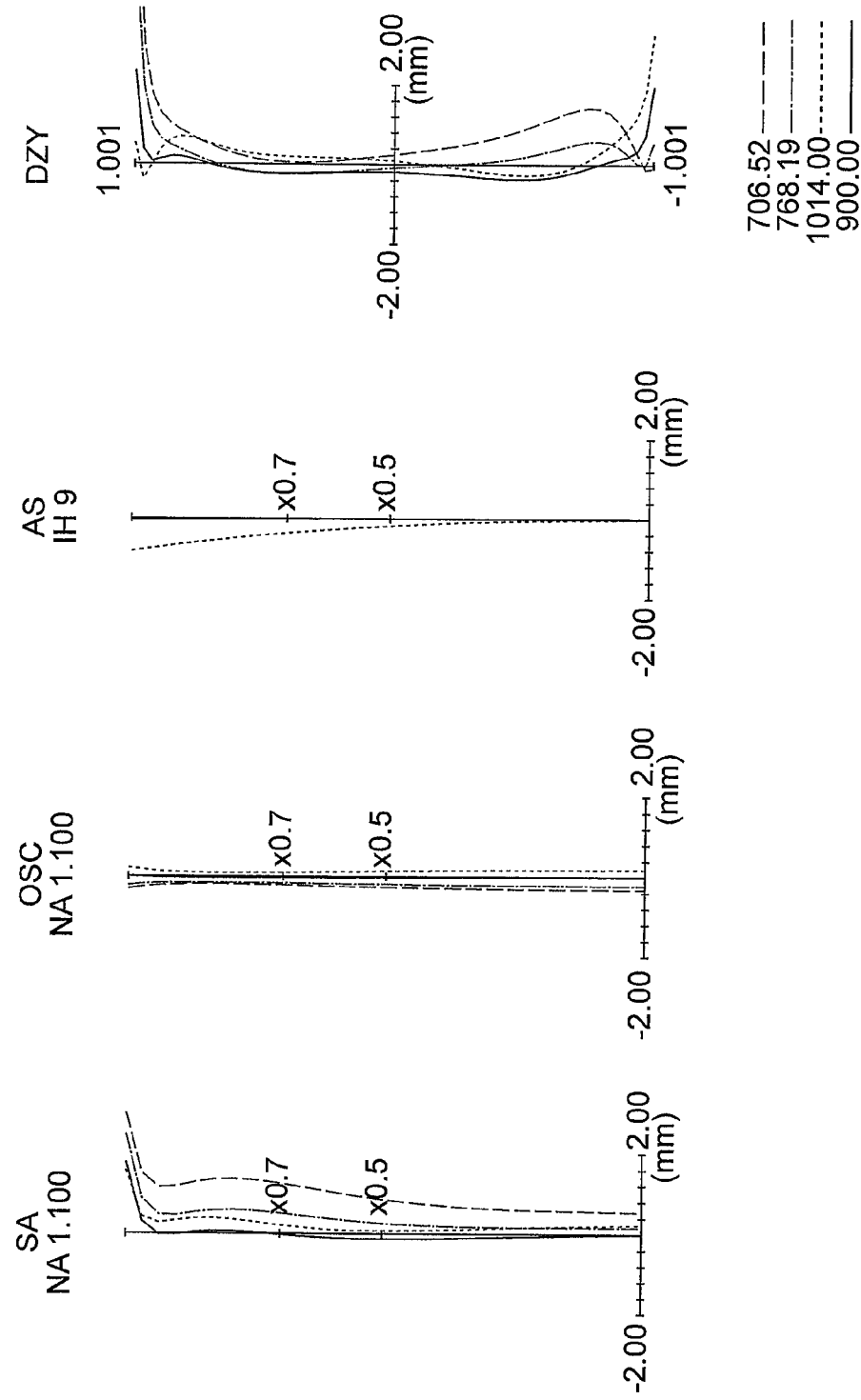
FIGS. 4A, 4B, 4C, and 4D are aberration diagrams of the immersion microscope objective according to the example 1.
Figure 5:
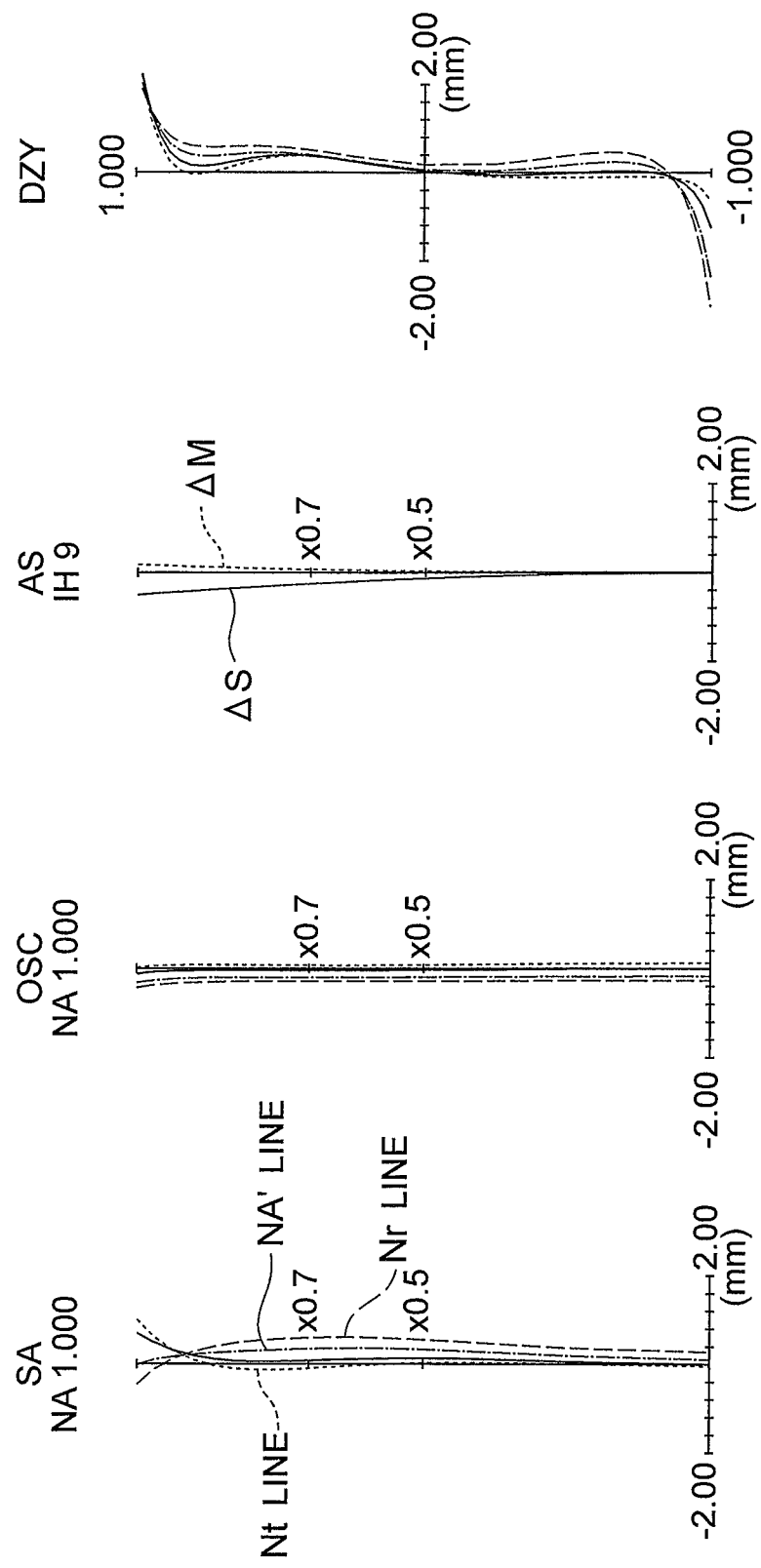
FIGS. 5A, 5B, 5C, and 5D are aberration diagrams of the immersion microscope objective according to the example 2, illustrating the aberrations in a state 1.
Figure 6:
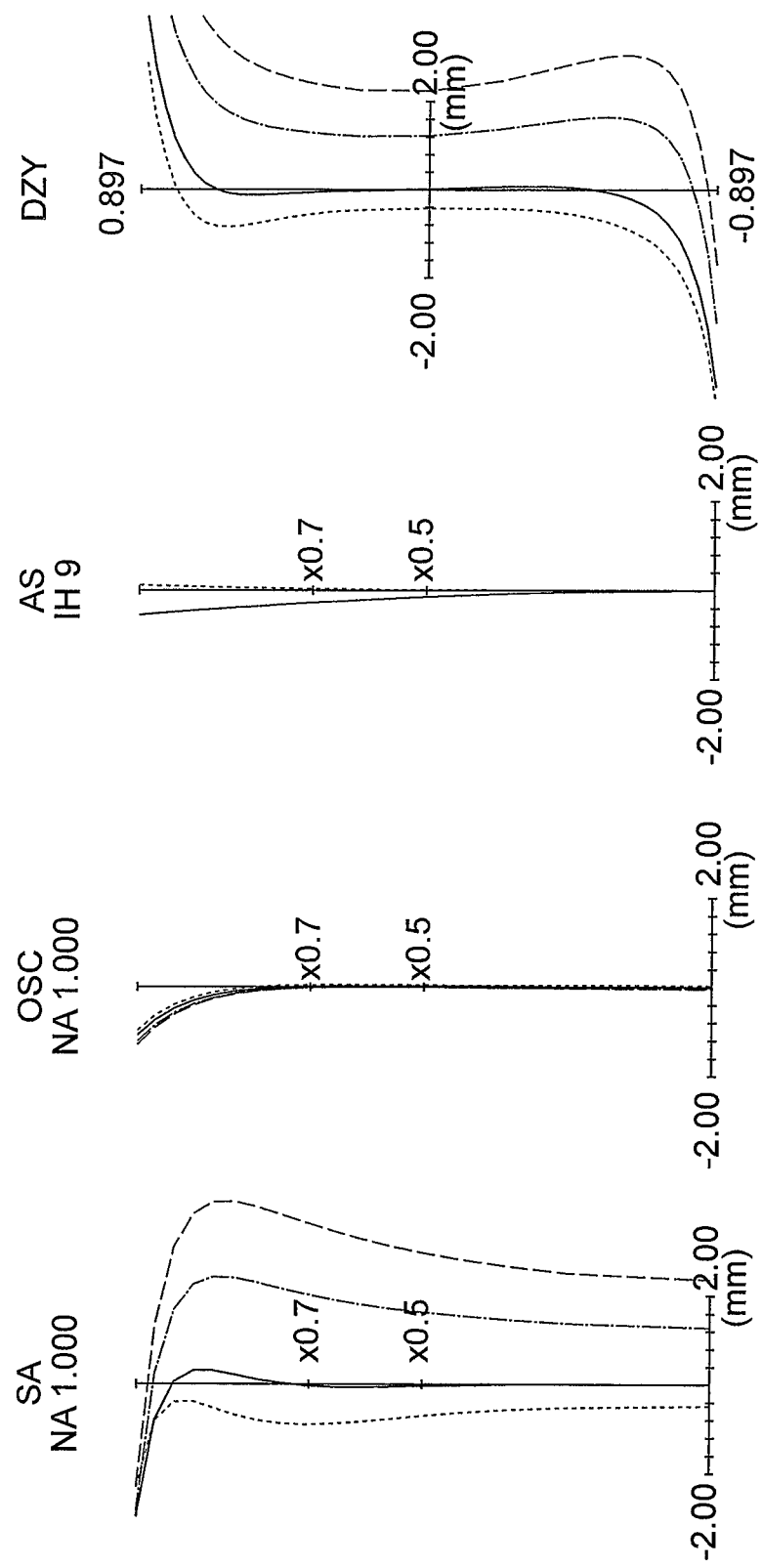
FIGS. 6A, 6B, 6C, and 6D are aberration diagrams of the immersion microscope objective according to the example 2, illustrating the aberrations in a state 2.
Figure 7:
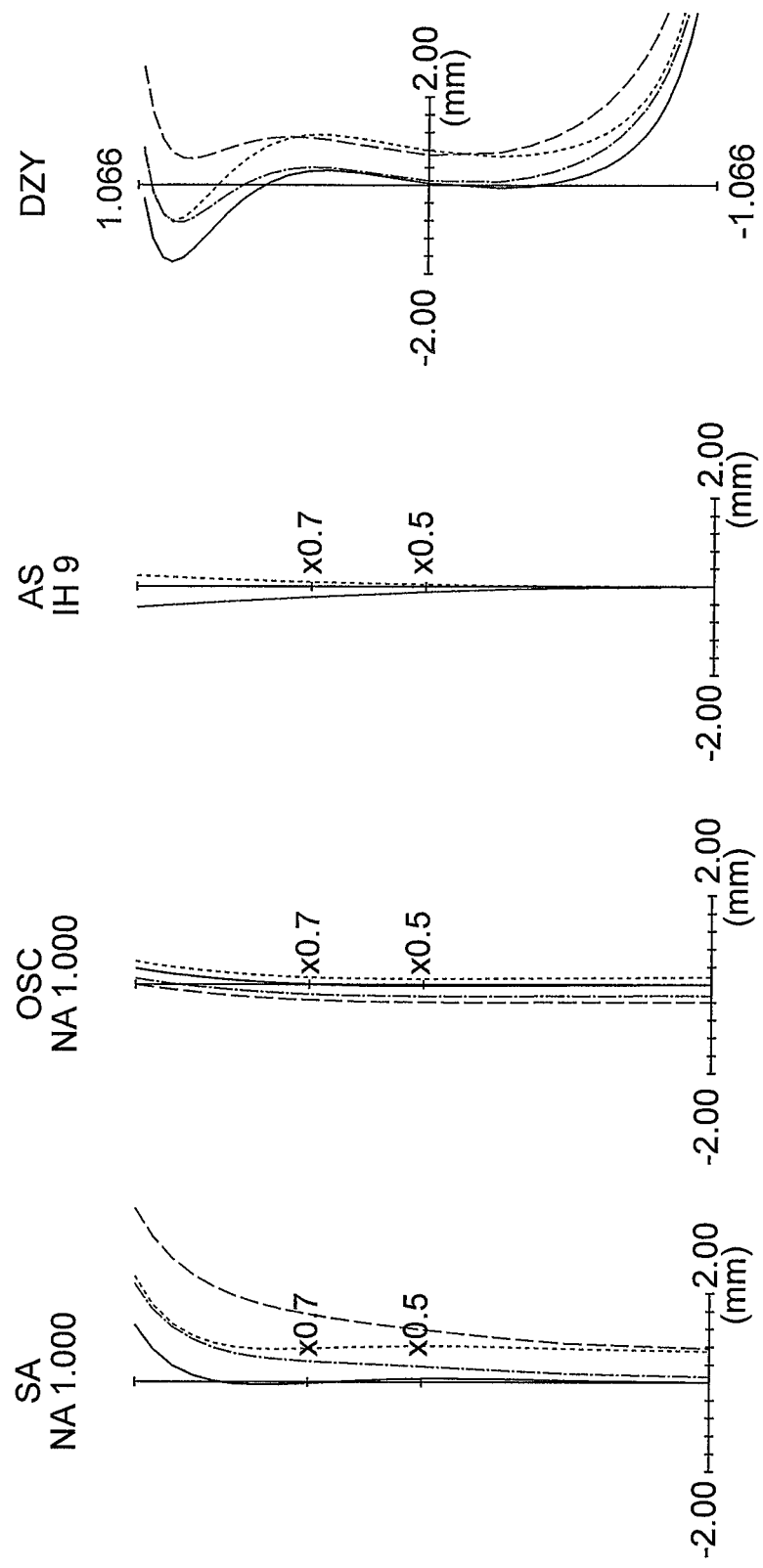
FIGS. 7A, 7B, 7C, and 7D are aberration diagrams of the immersion microscope objective according to the example 2, illustrating the aberrations in a state 3.
Figure 8:
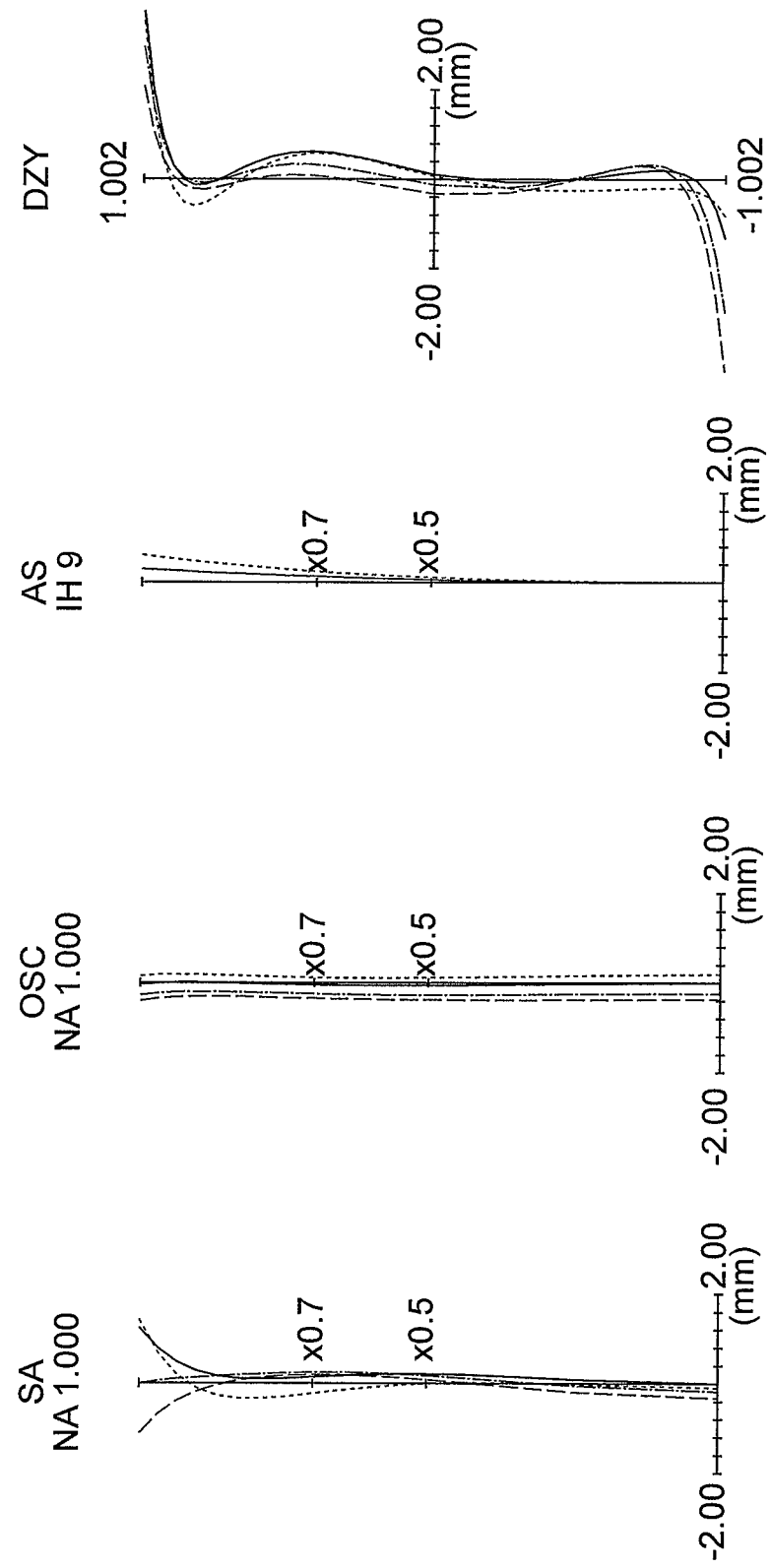
FIGS. 8A, 8B, 8C, and 8D are aberration diagrams of the immersion microscope objective according to the example 3, illustrating the aberrations in the state 1.
Figure 9:
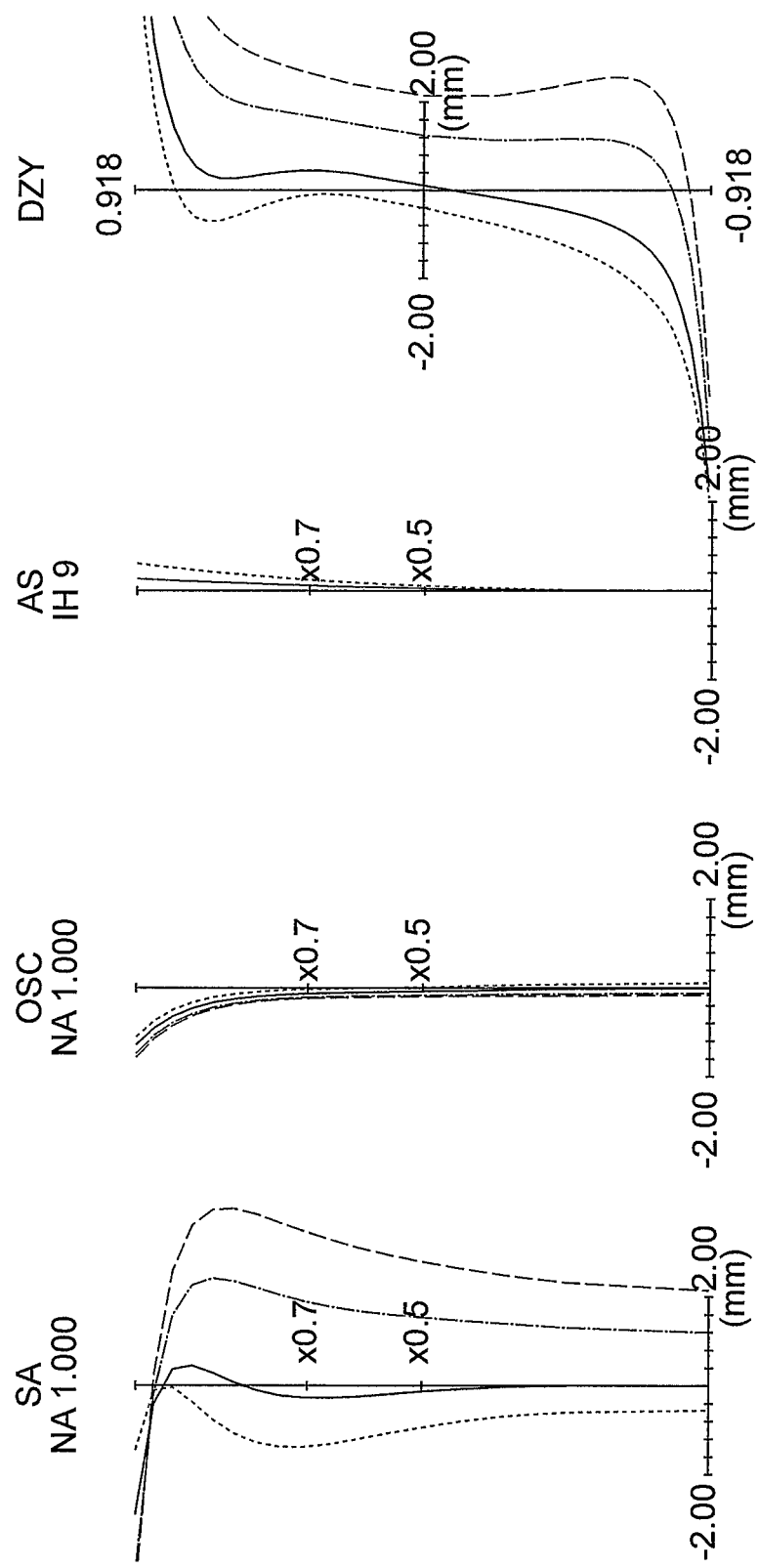
FIGS. 9A, 9B, 9C, and 9D are aberration diagrams of the immersion microscope objective according to the example 3, illustrating the aberrations in the state 2.
Figure 10:
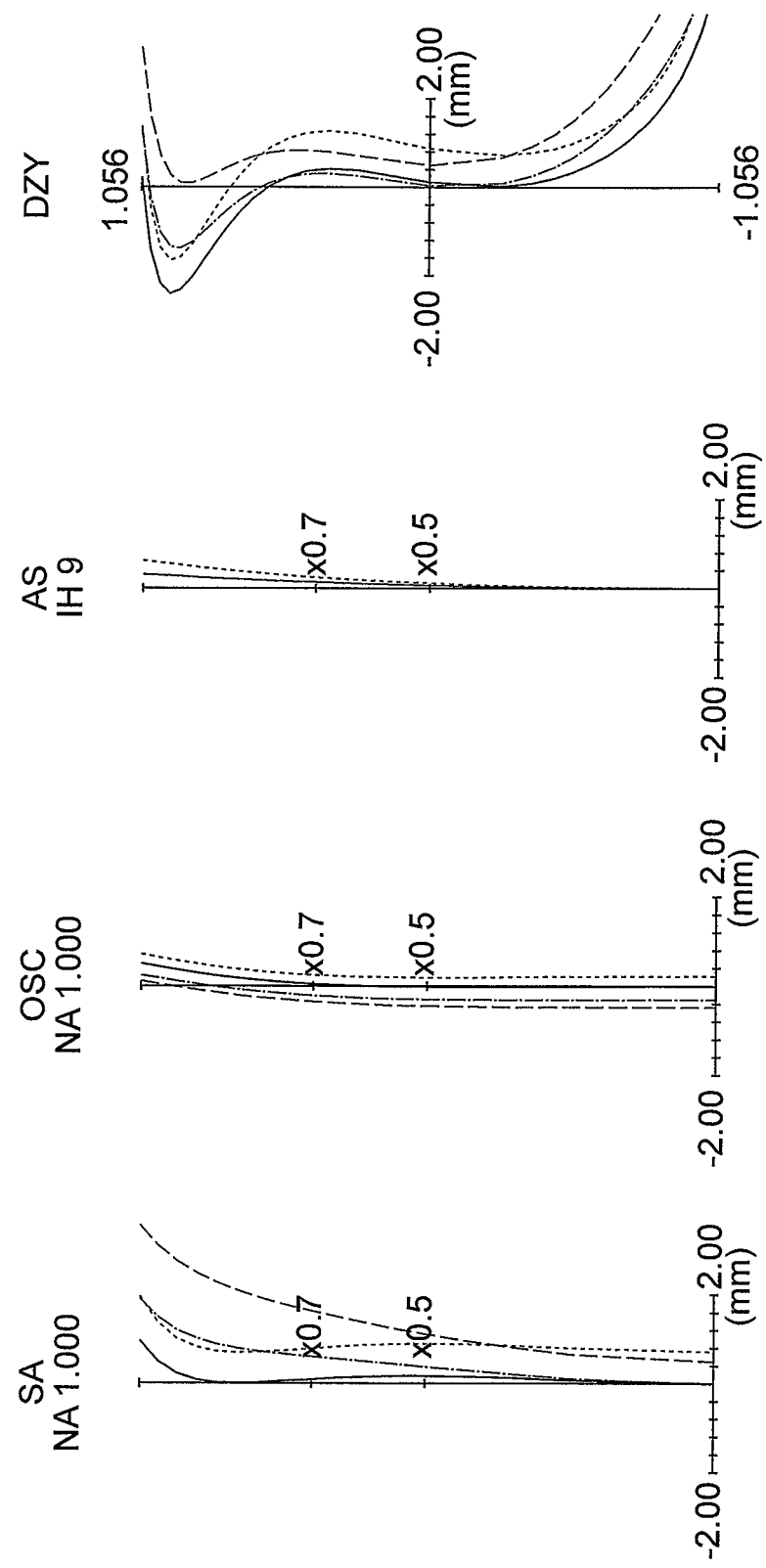
FIGS. 10A, 10B, 10C, and 10D are aberration diagrams of the immersion microscope objective according to the example 3, illustrating the aberrations in the state 3.
Figure 11:
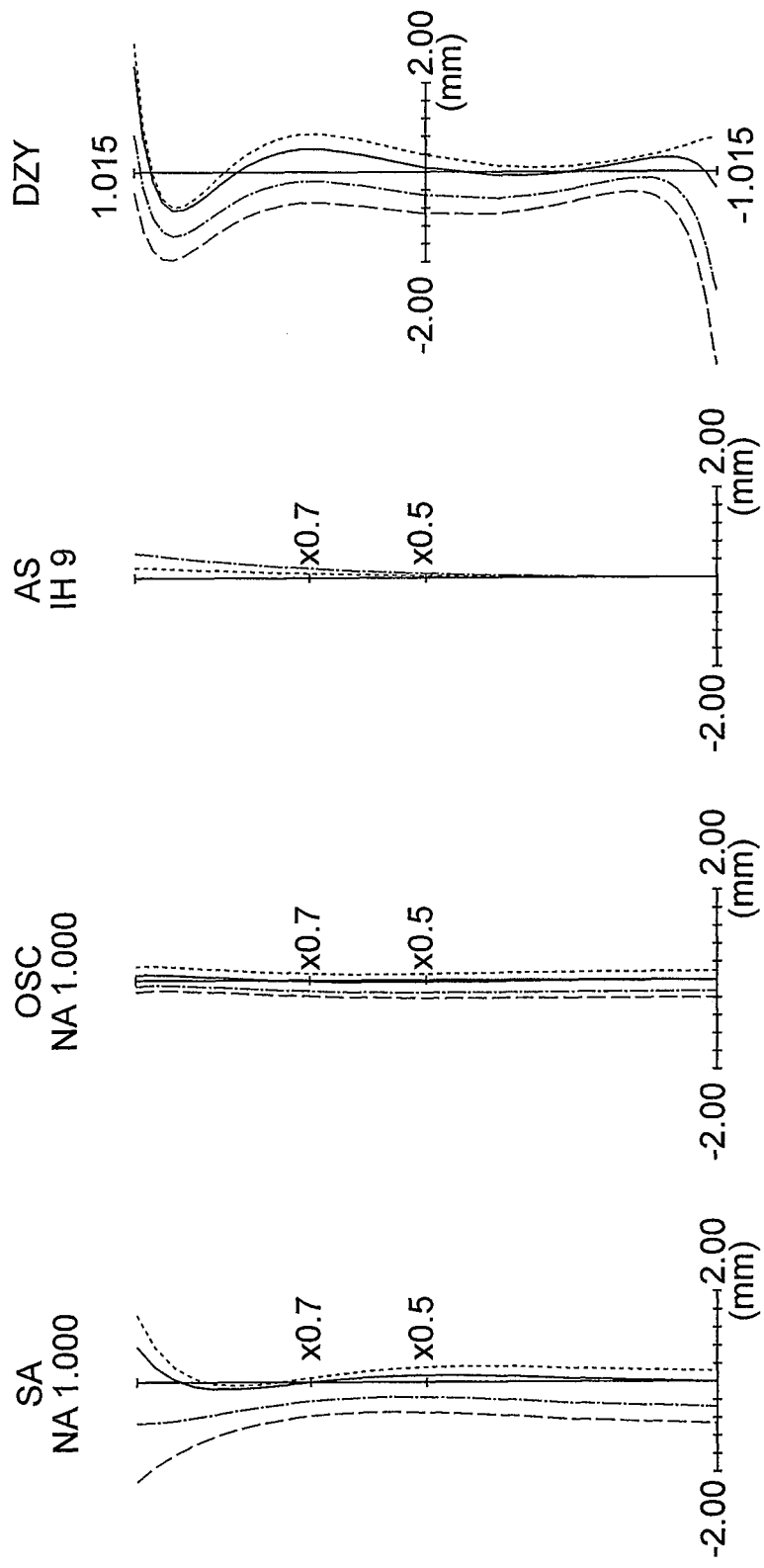
FIGS. 11A, 11B, 11C, and 11D are aberration diagrams of the immersion microscope objective according to the example 3, illustrating the aberrations in a state 4.
Figure 12:
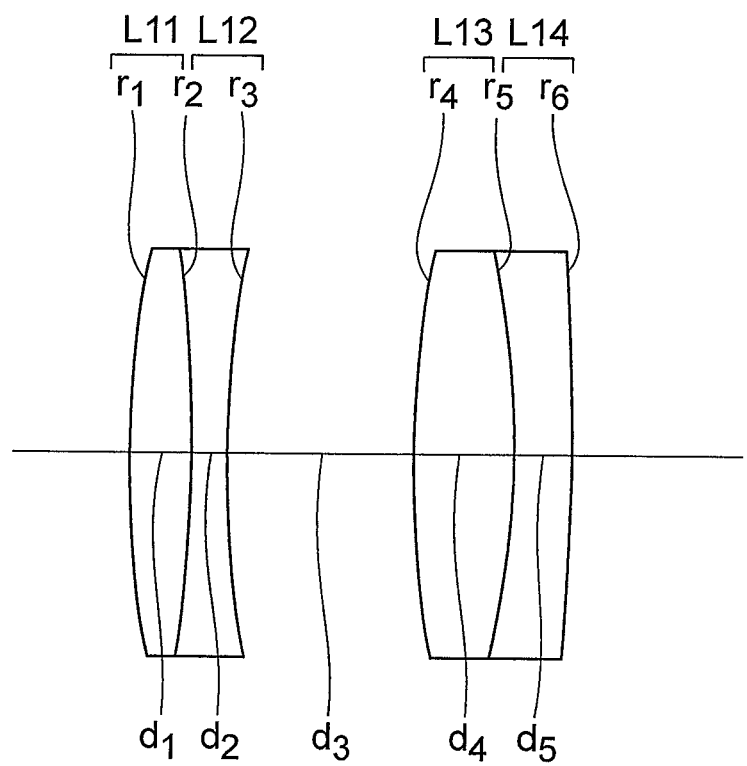
FIG. 12 is a cross-sectional view of a tube lens.

Examples 1 to 3 of the immersion microscope objective according to the present invention will be described below. FIGS. 1 to 3 are cross-sectional views along the optical axes, showing the optical arrangements of the immersion microscope objectives according to the examples 1 to 3, respectively. In the cross-sectional views, reference numerals L1 to L15 denote lenses. FIG. 12 is a cross-sectional view of a tube lens.

The immersion microscope objectives of the examples 1 to 3 are infinity-corrected microscope objectives. In an infinity-corrected microscope objective, light rays exiting the microscope objective are collimated, so an image is not formed in itself. Therefore, the parallel light beam is made to converge by a tube lens as shown in FIG. 12, for example. An image of a sample plane is formed at the position where the parallel light beam converges.

An objective according to the example 1 will now be described. As shown in FIG. 1, the objective of the example 1 includes, in order from an object side, a first lens group G1, a second lens group G2, and a third lens group G3.

The first lens group G1 has a positive refractive power. The first lens group G1 includes, in order from the object side, a planoconvex positive lens L1, a positive meniscus lens L2 having a convex surface facing an image side, a positive meniscus lens L3 having a convex surface facing the image side, a biconvex positive lens L4, and a negative meniscus lens L5 having a convex surface facing the image side. Here, the planoconvex positive lens L1 and the positive meniscus lens L2 are cemented together. Further, the biconvex positive lens L4 and the negative meniscus lens L5 are cemented together.

The second lens group G2 has a negative refractive power. The second lens group G2 includes, in order from the object side, a negative meniscus lens L6 having a convex surface facing the object side, a biconvex positive lens L7, and a negative meniscus lens L8 having a convex surface facing the image side. Here, the negative meniscus lens L6, the biconvex positive lens L7, and the negative meniscus lens L8 are cemented together.

The third lens group G3 has a positive refractive power. The third lens group G3 includes, in order from the object side, a biconvex positive lens L9, a biconvex positive lens L10, a biconcave negative lens L11, a biconvex positive lens L12, a biconcave negative lens L13, a biconcave negative lens L14, and a biconvex positive lens L15. Here, the biconvex positive lens L10 and the biconcave negative lens L11 are cemented together. Further, the biconvex positive lens L12 and the biconcave negative lens L13 are cemented together.

The first lens group G1, the second lens group G2, and the third lens group G3 are stationary all the time (with their positions fixed).

Next, an objective according to the example 2 will be described. As shown in FIG. 2, the objective of the example 2 includes, in order from an object side, a first lens group G1, a second lens group G2, and a third lens group G3.

The first lens group G1 has a positive refractive power. The first lens group G1 includes, in order from the object side, a planoconvex positive lens L1, a positive meniscus lens L2 having a convex surface facing an image side, a planoconvex positive lens L3, a biconvex positive lens L4, and a negative meniscus lens L5 having a convex surface facing the image side. Here, the planoconvex positive lens L1 and the positive meniscus lens L2 are cemented together. Further, the biconvex positive lens L4 and the negative meniscus lens L5 are cemented together.

The second lens group G2 has a negative refractive power. The second lens group G2 includes, in order from the object side, a biconcave negative lens L6, a biconvex positive lens L7, and a biconcave negative lens L8. Here, the biconcave negative lens L6, the biconvex positive lens L7, and the biconcave negative lens L8 are cemented together.

The third lens group G3 has a positive refractive power. The third lens group G3 includes, in order from the object side, a biconvex positive lens L9, a biconvex positive lens L10, a biconcave negative lens L11, a biconvex positive lens L12, a biconcave negative lens L13, a negative meniscus lens L14 having a convex surface facing the image side, and a positive meniscus lens L15 having a convex surface facing the image side. Here, the biconvex positive lens L10 and the biconcave negative lens L11 are cemented together. Further, the biconvex positive lens L12 and the biconcave negative lens L13 are cemented together.

The first lens group G1 and the third lens group G3 are stationary all the time (with their positions fixed). On the other hand, the second lens group G2 moves along the optical axis with respect to the first lens group G1 and the third lens group G3.

Next, an objective according to the example 3 will be described. As shown in FIG. 3, the objective of the example 3 includes, in order from an object side, a first lens group G1, a second lens group G2, and a third lens group G3.

The first lens group G1 has a positive refractive power. The first lens group G1 includes, in order from the object side, a planoconvex positive lens L1, a positive meniscus lens L2 having a convex surface facing an image side, a biconvex positive lens L3, a biconvex positive lens L4, and a negative meniscus lens L5 having a convex surface facing the image side. Here, the planoconvex positive lens L1 and the positive meniscus lens L2 are cemented together. Further, the biconvex positive lens L4 and the negative meniscus lens L5 are cemented together.

The second lens group G2 has a negative refractive power. The second lens group G2 includes, in order from the object side, a biconcave negative lens L6, a biconvex positive lens L7, and a biconcave negative lens L8. Here, the biconcave negative lens L6, the biconvex positive lens L7, and the biconcave negative lens L8 are cemented together.

The third lens group G3 has a positive refractive power. The third lens group G3 includes, in order from the object side, a biconvex positive lens L9, a biconvex positive lens L10, a biconcave negative lens L11, a biconvex positive lens L12, a biconcave negative lens L13, a negative meniscus lens L14 having a convex surface facing the image side, and a positive meniscus lens L15 having a convex surface facing the image side. Here, the biconvex positive lens L10 and the biconcave negative lens L11 are cemented together. Further, the biconvex positive lens L12 and the biconcave negative lens L13 are cemented together.

The first lens group G1 and the third lens group G3 are stationary all the time (with their positions fixed). On the other hand, the second lens group G2 moves along the optical axis with respect to the first lens group G1 and the third lens group G3.

Numerical data of optical members forming the objective of each of the above-described examples will be given below. In the numerical data for each example, r denotes a radius of curvature of each lens surface (except that r1 and r2 are virtual surfaces), d denotes a thickness of each lens or an air space (except that d1 denotes a thickness of a cover glass, and d2 denotes a thickness of an immersion liquid layer), n900 denotes the refractive index of each lens at the wavelength of 900 nm, nd denotes the refractive index of each lens for the d-line, νd denotes an Abbe number of each lens, NA denotes a numerical aperture, f denotes a focal length of the entire objective system, and β denotes a magnification. It should be noted that the magnification β is a magnification when the objective is combined with a tube lens (having a focal length of 180 mm) which will be described later.

In a numerical example 1, there is no cover glass between a sample and the objective. In this state, an image of the sample is formed via an immersion liquid alone. Accordingly, the virtual surfaces r1 and r2 each indicate a boundary between the immersion liquid and the sample plane. Further, surface data in the numerical example 1 show the numerical values obtained when glycerin is used as the immersion liquid.

In numerical examples 2 and 3, when the value of d1 is zero, it means that there is no cover glass between the sample and the objective. In this state, an image of the sample is formed via the immersion liquid alone. Further, in this case, the virtual surfaces r1 and r2 each indicate the boundary between the immersion liquid and the sample plane.

On the other hand, when the value of d1 is not zero, it means that there is a cover glass between the sample and the objective. In this state, an image of the sample is formed via the cover glass and the immersion liquid. Further, in this case, the virtual surface r1 indicates a boundary between the sample plane and the cover glass, and the virtual surface r2 indicates a boundary between the cover glass and the immersion liquid. If the cover glass is regarded as a sample, the virtual surface r2 becomes the boundary between the immersion liquid and the sample plane, and the virtual surface r1 becomes an interior of the sample. It is thus evident that the interior of the sample can be observed.

With each of the objectives of the examples 2 and 3, a favorable image of the sample is obtained, irrespective of the presence or absence of the cover glass and irrespective of the change in the type of the immersion liquid. To this end, in the objective of the example 2, the second lens group includes a moving lens group. Similarly, in the objective of the example 3, the second lens group includes a moving lens group.

It should be noted that the surface data in the numerical examples 2 and 3 show the numerical values in a state 1 where a liquid A (glycerin) is used as the immersion liquid. Differences among states 1 to 4 are as follows. Further, in the numerical example 2, numerical values in each of the states 1 to 3 are shown in the column of various data. In the numerical example 3, numerical values in each of the states 1 to 4 are shown in the column of various data. Further, the radius of curvature r and the surface separation d are shown in millimeters (mm).

|         | Cover glass | Immersion liquid       |
|---------|-------------|------------------------|
| State 1 | absent      | Liquid A (glycerin)    |
| State 2 | absent      | Liquid B (silicone oil)|
| State 3 | absent      | Liquid C (immersion oil)|
| State 4 | present     | Liquid D               |

Example 1

| NA = 1.1, WD = 13 mm, FL = 7.2161 mm, β = −24.959 | | | | |
|---|---|---|---|---|
| Surface data | | | | |
| Surface no. | r | d | n900 | nd | vd |
| 1 | ∞ | 0 | | | |
| 2 | ∞ | 13.0000 | 1.46650 | 1.47388 | 60.45 |
| 3 | ∞ | 1.3360 | 1.50854 | 1.51633 | 64.14 |
| 4 | −110.4459 | 9.9876 | 1.86397 | 1.88300 | 40.76 |
| 5 | −21.8870 | 0.2000 | | | |
| 6 | −88.5335 | 7.0285 | 1.58713 | 1.59522 | 67.74 |
| 7 | −28.1666 | 0.2000 | | | |
| 8 | 101.7793 | 15.7964 | 1.58713 | 1.59522 | 67.74 |
| 9 | −25.1399 | 2.0000 | 1.62408 | 1.63775 | 42.41 |
| 10 | −65.6527 | 0.2500 | | | |
| 11 | 117.6662 | 2.0000 | 1.62408 | 1.63775 | 42.41 |
| 12 | 31.0443 | 18.2800 | 1.43436 | 1.43875 | 94.93 |
| 13 | −24.6558 | 1.7000 | 1.71843 | 1.73800 | 32.26 |
| 14 | −105.7536 | 0.2500 | | | |
| 15 | 29.0784 | 10.9238 | 1.58713 | 1.59522 | 67.74 |
| 16 | −109300.0000 | 0.2500 | | | |
| 17 | 118.8008 | 7.9187 | 1.58713 | 1.59522 | 67.74 |
| 18 | −37.6008 | 1.5000 | 1.62408 | 1.63775 | 42.41 |
| 19 | 59.6342 | 0.2500 | | | |
| 20 | 18.6107 | 14.7079 | 1.59433 | 1.60300 | 65.44 |
| 21 | −33.0567 | 1.2000 | 1.65754 | 1.67300 | 38.15 |
| 22 | 6.3935 | 5.9774 | | | |
| 23 | −11.7598 | 2.0000 | 1.78837 | 1.80400 | 46.57 |
| 24 | 69.9402 | 2.7083 | | | |
| 25 | 45.8096 | 3.5327 | 1.81778 | 1.84666 | 23.88 |
| 26 | −25.3384 | | | | |

Example 2

| NA = 1, WD = 8.05 mm, FL = 7.2232 mm, β = −24.959 | | | | |
|---|---|---|---|---|
| Surface data | | | | |
| Surface no. | r | d | n900 | nd | vd |
| 1 | ∞ | d1 | | | |
| 2 | ∞ | d2 | 1.46650 | 1.47388 | 60.45 |
| 3 | ∞ | 2.6879 | 1.50854 | 1.51633 | 64.14 |
| 4 | −16.9025 | 3.0029 | 1.86397 | 1.88300 | 40.76 |
| 5 | −10.3698 | 0.2000 | | | |
| 6 | ∞ | 3.3780 | 1.58713 | 1.59522 | 67.74 |
| 7 | −21.7452 | 0.2000 | | | |
| 8 | 23.5437 | 5.5835 | 1.58713 | 1.59522 | 67.74 |
| 9 | −37.5468 | 2.0000 | 1.60077 | 1.61336 | 44.49 |
| 10 | −97.3456 | d10 | | | |
| 11 | −270.1833 | 2.0000 | 1.62408 | 1.63775 | 42.41 |
| 12 | 12.6936 | 8.1203 | 1.43436 | 1.43875 | 94.93 |
| 13 | −14.0863 | 2.0000 | 1.71843 | 1.73800 | 32.26 |
| 14 | 70.0358 | d14 | | | |
| 15 | 407.9861 | 2.4899 | 1.58713 | 1.59522 | 67.74 |
| 16 | −30.8143 | 0.1000 | | | |
| 17 | 16.9188 | 6.8586 | 1.58713 | 1.59522 | 67.74 |
| 18 | −19.7939 | 1.5000 | 1.62408 | 1.63775 | 42.41 |
| 19 | 803.0398 | 0.2500 | | | |
| 20 | 11.3180 | 5.9746 | 1.58713 | 1.59522 | 67.74 |
| 21 | −39.2442 | 1.2000 | 1.65754 | 1.67300 | 38.15 |
| 22 | 5.7243 | 5.7461 | | | |
| 23 | −8.0830 | 1.1200 | 1.78837 | 1.80400 | 46.57 |
| 24 | −77.8294 | 9.3728 | | | |
| 25 | −137.2597 | 3.3595 | 1.71843 | 1.73800 | 32.26 |
| 26 | −18.4571 | | | | |

| NA = 1, WD = 8.05 mm, FL = 7.2232 mm, β = −24.959 | | | |
|---|---|---|---|
| Various data | | | |
| | d | n900 | nd | vd |
| State 1 | | | | |
| d1 | 0 | 1.51497 | 1.52344 | 54.41 |
| d2 | 8.0500 | 1.46650 | 1.47388 | 60.45 |
| d10 | 2.5823 | | | |
| d14 | 2.0177 | | | |
| State 2 | | | | |
| d1 | 0 | 1.51497 | 1.52344 | 54.41 |
| d2 | 7.5951 | 1.39737 | 1.40420 | 52.02 |
| d10 | 0.5000 | | | |
| d14 | 4.1000 | | | |
| State 3 | | | | |
| d1 | 0 | 1.51497 | 1.52344 | 54.41 |
| d2 | 8.2866 | 1.50455 | 1.51495 | 41.00 |
| d10 | 3.8000 | | | |
| d14 | 0.8000 | | | |

Example 3

| NA = 1, WD = 10.05 mm, FL = 7.2209 mm, β = −24.959 | | | | |
|---|---|---|---|---|
| Surface data | | | | |
| Surface no. | r | d | n900 | nd | vd |
| 1 | ∞ | d1 | | | |
| 2 | ∞ | d2 | 1.46650 | 1.47388 | 60.45 |
| 3 | ∞ | 3.7627 | 1.50854 | 1.51633 | 64.14 |
| 4 | −21.2545 | 3.9154 | 1.86397 | 1.88300 | 40.76 |
| 5 | −13.2251 | 0.2000 | | | |
| 6 | 153.8518 | 4.6461 | 1.58713 | 1.59522 | 67.74 |
| 7 | −32.5785 | 0.2000 | | | |
| 8 | 38.5443 | 7.4844 | 1.58713 | 1.59522 | 67.74 |
| 9 | −32.9606 | 2.0000 | 1.62408 | 1.63775 | 42.41 |
| 10 | −70.5057 | d10 | | | |
| 11 | −273.4258 | 2.0000 | 1.62408 | 1.63775 | 42.41 |
| 12 | 17.6274 | 10.6242 | 1.43436 | 1.43875 | 94.93 |
| 13 | −19.2934 | 1.7000 | 1.71843 | 1.73800 | 32.26 |
| 14 | 206.2474 | d14 | | | |
| 15 | 582.5255 | 3.0400 | 1.58713 | 1.59522 | 67.74 |
| 16 | −40.1090 | 0.2500 | | | |
| 17 | 32.6954 | 10.3429 | 1.58713 | 1.59522 | 67.74 |
| 18 | −16.8746 | 1.5000 | 1.62408 | 1.63775 | 42.41 |
| 19 | 538.1095 | 0.2500 | | | |
| 20 | 11.1595 | 9.8273 | 1.59433 | 1.60300 | 65.44 |
| 21 | −94.8477 | 1.2000 | 1.62408 | 1.63775 | 42.41 |
| 22 | 5.2731 | 6.9811 | | | |
| 23 | −7.4552 | 2.0000 | 1.78837 | 1.80400 | 46.57 |
| 24 | −27.4322 | 9.0770 | | | |
| 25 | −22.9699 | 3.1451 | 1.77762 | 1.80000 | 29.84 |
| 26 | −13.5926 | | | | |

| Various data | | | |
|---|---|---|---|
| | d | n900 | nd | vd |
| State 1 | | | | |
| d1 | 0 | 1.51497 | 1.52344 | 54.41 |
| d2 | 10.050 | 1.46650 | 1.47388 | 60.45 |
| d10 | 3.1405 | | | |
| d14 | 2.5595 | | | |
| State 2 | | | | |
| d1 | 0 | 1.51497 | 1.52344 | 54.41 |
| d2 | 9.5692 | 1.39737 | 1.40420 | 52.02 |
| d10 | 0.4504 | | | |
| d14 | 5.2496 | | | |

-continued

NA = 1, WD = 10.05 mm, FL = 7.2209 mm, β = −24.959

State 3

| | | | | |
|---|---|---|---|---|
| d1 | 0 | 1.51497 | 1.52344 | 54.41 |
| d2 | 10.3041 | 1.50455 | 1.51495 | 41.00 |
| d10 | 4.7546 | | | |
| d14 | 0.9454 | | | |

State 4

| | | | | |
|---|---|---|---|---|
| d1 | 0.2300 | 1.51497 | 1.52344 | 54.41 |
| d2 | 9.8899 | 1.47597 | 1.47388 | 60.81 |
| d10 | 3.5737 | | | |
| d14 | 2.1263 | | | |

Tube lens Surface data

| No. | r | d | n900 | nd | νd |
|---|---|---|---|---|---|
| 1 | 95.2596 | 5.3317 | 1.56907 | 1.56907 | 71.30 |
| 2 | −116.2766 | 2.8267 | 1.50847 | 1.50847 | 61.19 |
| 3 | 80.4059 | 16.3504 | | | |
| 4 | 92.0498 | 8.7567 | 1.48749 | 1.48749 | 70.23 |
| 5 | −73.2447 | 4.8745 | 1.62408 | 1.63775 | 42.41 |
| 6 | 292.4080 | | | | | focal length 180 mm

At the time of combining the objective of each example with a tube lens, the distance between the objective and the tube lens may be set within a range from 50 mm to 200 mm.

FIGS. 4A, 4B, 4C, and 4D to FIGS. 11A, 11B, 11C, and 11D are aberration diagrams of the objectives according to the examples 1 to 3, showing the aberrations in the following states. The surface separation between the objective and the tube lens were 122.7226 mm in the example 1, 166.2259 mm in the example 2, and 145.8239 mm in the example 3.

| | Example | State |
|---|---|---|
| FIGS. 4A to 4D | Example 1 | State 1 |
| FIGS. 5A to 5D | Example 2 | State 1 |
| FIGS. 6A to 6D | Example 2 | State 2 |
| FIGS. 7A to 7D | Example 2 | State 3 |
| FIGS. 8A to 8D | Example 3 | State 1 |
| FIGS. 9A to 9D | Example 3 | State 2 |
| FIGS. 10A to 10D | Example 3 | State 3 |
| FIGS. 11A to 11D | Example 3 | State 4 |

Further, in these aberration diagrams, "IH" denotes an image height. FIGS. 4A, 5A, 6A, 7A, 8A, 9A, 10A, and 11A each show a spherical aberration (SA), FIGS. 4B, 5B, 6B, 7B, 8B, 9B, 10B, and 11B each show an offense against the sine condition (OSC), FIGS. 4C, 5C, 6C, 7C, 8C, 9C, 100, and 11C each show an astigmatism (AS), and FIGS. 4D, 5D, 6D, 7D, 8D, 9D, 10D, and 11D each show a coma (DZY). In the graph of coma (DZY), the vertical axis represents an aperture ratio at an image height ratio of 0.5.

Next, the values of conditional expressions (1) to (6) in each example are shown below.

| Conditional expressions | Example1 | Example2 | Example3 |
|---|---|---|---|
| (1) $NA_o \times d_0$ | | | |
| Immersion liquid A | 14.300 | 8.050 | 10.050 |
| Immersion liquid B | — | 7.595 | 9.569 |
| Immersion liquid C | — | 8.287 | 10.304 |
| Immersion liquid D | — | — | 10.120 |
| (2) $d_0 \times nd_0$ | | | |
| Immersion liquid A | 19.160 | 11.865 | 14.812 |
| Immersion liquid B | — | 10.665 | 13.437 |
| Immersion liquid C | — | 12.554 | 15.610 |
| Immersion liquid D | — | — | 15.012 |
| (3) $(d_1/d_0) \times (nd_m - nd_0)$ | | | |
| Immersion liquid A | 0.042 | 0.137 | 0.153 |
| Immersion liquid B | — | 0.169 | 0.188 |
| Immersion liquid C | — | 0.119 | 0.134 |
| Immersion liquid D | — | — | 0.149 |
| (4) $|d_1/R_1|$ | 0.012 | 0.159 | 0.177 |
| (5) $(OPL_{max} - OPL_{min})/f$ | — | 0.257 | 0.295 |
| (6) $m_{g2}$ | — | −1.261 | −1.018 |
| (7) $f/f_{2m}$ | — | −0.363 | −0.240 |

Figure 13:
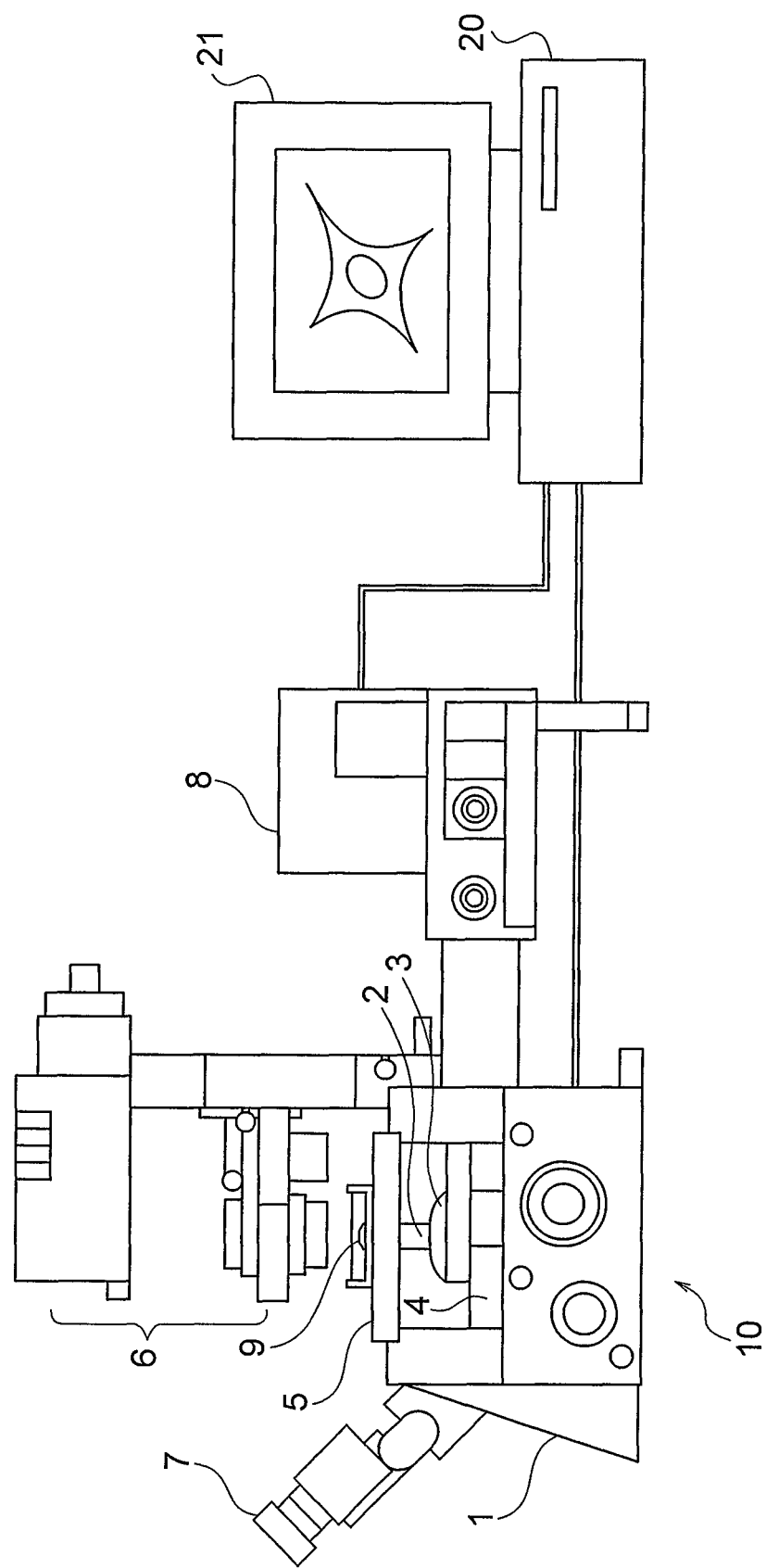
FIG. 13 is a diagram of a microscope having the immersion microscope objective of the present invention used therein.

FIG. 13 is a diagram showing the microscope according to the present embodiment. In FIG. 13, an example of an external structure of a laser scanning microscope is shown as an example of the microscope. As shown in FIG. 13, a microscope 10 includes a main body section 1, an objective 2, a revolver 3, an objective raising and lowering mechanism 4, a stage 5, an epi-illumination unit 6, an observation lens barrel 7, and a scanner 8. Moreover, an image processing apparatus 20 is connected to the microscope 10, and an image display apparatus 21 is connected to the image processing apparatus 20. In the microscope according to the present embodiment, the immersion microscope objective according to the present embodiment is used for the objective 2.

The stage 5 is provided to the main body section 1. A sample 9 is to be placed on the stage 5. Moreover, the epi-illumination unit 6 is provided at an upper side of the main body section 1. Epi-illumination visible light is irradiated to the sample 9 by the epi-illumination unit 6. Light from the sample 9 travels through the objective 2, and reaches the observation lens barrel 7. A user is able to observe the sample 9 through the observation lens barrel 7 in visible light.

Moreover, a laser source (not shown in the diagram) and the scanner 8 are provided at a rear side (right side of a paper surface) of the main body section 1. The laser source and the scanner 8 are connected by a fiber (not shown in the diagram). The scanner 8 includes a galvanometer scanner and a photo detection element, which are disposed at an interior of the scanner 8. The laser source is a laser which generates an infrared light that can operate two-photon excitation. Light from the laser source, after travelling through the scanner 8 is incident on the objective 2. The objective 2 is positioned at a lower side of the stage 5. Therefore, the sample 9 is illuminated from a lower side as well.

Light (reflected light or fluorescent light) from the sample 9, upon travelling through the objective 2, passes through the scanner 8, and is detected by the photo detection element. In the two-photon excitation, since fluorescent light generates only focal point, a confocal observation is possible. In the confocal observation, it is possible to obtain a cross-sectional image of the sample 9.

The objective raising and lowering mechanism 4 is connected to the revolver 3. The objective raising and lowering mechanism 4 is capable of moving the objective 2 (the revolver 3) along an optical axial direction. In a case in which, a plurality of cross-sectional images along the optical axial direction of the sample 9 are to be obtained, the objective 2 is to be moved by the objective raising and lowering mechanism 4.

A signal obtained by the photo detection element is transmitted to the image processing apparatus 20. An image processing is carried out in the image processing apparatus 20, and an image of the sample 9 is displayed on the image display apparatus 21.

In the example described above, the immersion microscope objective according to the present embodiment has been used for the two-photon excitation observation. However, it is also possible to use the immersion microscope objective according to the present embodiment for a total internal reflection fluorescence observation. In such case, a diameter of a bundle of rays from the laser source is to be kept smaller than an effective aperture of the immersion microscope objective. Moreover, an arrangement is to be made such that, the bundle of rays from the laser source is made to be incident on the immersion microscope objective such that it does not include an optical axis of the immersion microscope objective.

Moreover, in the present embodiment, the immersion microscope objective is used also for an observation of visible light. If in a case in which, the aberration performance in a visible region is not sufficient, an objective for observing visible light and an objective for observing two-photon excitation may be installed on a revolver 3, and may be switched according to the method of observation.

According to the present invention, it is possible to provide an immersion microscope objective which enables observation of a deeper portion of a sample with high resolving power, and also provide a microscope using the immersion microscope objective.

It should be noted that various modifications can be made to the present invention without departing from the scope thereof.

As described above, the present invention is suitably applicable to an immersion microscope objective which enables observation of a deeper portion of a sample with high resolving power, and to a microscope using the immersion microscope objective.

What is claimed is:

1. An immersion microscope objective comprising, in order from an object side:
   a first lens group having a positive refractive power;
   a second lens group; and
   a third lens group;
   wherein:
   the first lens group changes a light beam from an object to a convergent light beam,
   the second lens group has a refractive power smaller than that of the first lens group, and
   the following conditional expression (1-1') is satisfied:

$$8 \text{ mm} \leq NA_o \times d_0 \quad (1\text{-}1'),$$

where:
   $NA_o$ denotes an object-side numerical aperture of the immersion microscope objective, and
   $d_0$ denotes a working distance of the immersion microscope objective.

2. The immersion microscope objective according to claim 1, wherein the following conditional expression (2) is satisfied:

$$10.6 \text{ mm} \leq d_0 \times nd_0 \leq 25 \text{ mm} \quad (2),$$

where:
   $d_0$ denotes the working distance of the immersion microscope objective, and
   $nd_0$ denotes a refractive index of an immersion liquid for a d-line.

3. The immersion microscope objective according to claim 2, wherein:
   the first lens group includes, in order from the object side, a cemented lens and a single lens having a positive refractive power, and
   the cemented lens includes, in order from the object side, a planoconvex lens and a meniscus lens.

4. The immersion microscope objective according to claim 2, wherein:
   the third lens group includes, in order from the object side, an object-side lens group and an image-side lens group,
   the object-side lens group includes a lens having a concave surface facing an image side and the concave surface is positioned nearest to the image side,
   the image-side lens group includes a lens having a concave surface facing the object side and the concave surface is positioned nearest to the object side, and
   the following conditional expressions (3) and (4) are satisfied:

$$0.02 \leq (d_1/d_0) \times (nd_m - nd_0) \leq 0.19 \quad (3), \text{ and}$$

$$0.01 \leq |d_1/R_1| \leq 0.185 \quad (4),$$

where:
   $d_0$ denotes the working distance of the immersion microscope objective,
   $d_1$ denotes a thickness on an optical axis of a lens positioned nearest to the object side,
   $nd_0$ denotes a refractive index of an immersion liquid for a d-line,
   $nd_m$ denotes a refractive index of a meniscus lens positioned nearest to the object side for the d-line, and
   $R_1$ denotes a radius of curvature of an object-side surface of a prescribed meniscus lens, the prescribed meniscus lens being a meniscus lens that is positioned nearest to the object side among any meniscus lenses having an image-side surface constituting an air-contact surface.

5. The immersion microscope objective according to claim 2, wherein:
   the second lens group includes a cemented lens and moves along an optical axis, and
   the following conditional expression (5) is satisfied:

$$0.205 \leq (OPL_{max} - OPL_{min})/f \leq 0.35 \quad (5),$$

where:
   $OPL_{max}$ denotes a maximum optical path length of a plurality of prescribed optical path lengths,
   $OPL_{min}$ denotes a minimum optical path length of the plurality of prescribed optical path lengths,
   $f$ denotes a focal length of an entire system of the immersion microscope objective, and
   the prescribed optical path length OPL is an optical path length between the immersion microscope objective and an in-focus position, and is expressed by the following expression (A):

$$OPL = \sum_{i=1}^{N} (W_i \times n_i) \quad (A)$$

where:
N denotes the number of substances that are present between the immersion microscope objective and the in-focus position,
$W_i$ denotes a width in an optical axis direction of an i-th substance among the substances, and
$n_i$ denotes a refractive index at a wavelength of 900 nm of the i-th substance among the substances.

6. The immersion microscope objective according to claim 2, wherein the following conditional expressions (6) and (7) are satisfied:

$$1.3 \leq m_{g2} \leq -0.8 \quad (6), \text{ and}$$

$$-0.38 \leq f/f_{2m} \leq 0 \quad (7),$$

where:
$m_{g2}$ denotes a magnification of the second lens group,
f denotes a focal length of an entire system of the immersion microscope objective, and
$f_{2m}$ denotes a focal length of the second lens group.

7. A microscope comprising:
a scanner section;
a main-body section; and
the immersion microscope objective recited in claim 1.

* * * * *